(12) United States Patent
Menge

(10) Patent No.: US 8,633,449 B2
(45) Date of Patent: Jan. 21, 2014

(54) SCINTILLATOR INCLUDING A SCINTILLATOR PARTICULATE AND A POLYMER MATRIX

(75) Inventor: Peter R. Menge, Novelty, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 196 days.

(21) Appl. No.: 13/160,142

(22) Filed: Jun. 14, 2011

(65) Prior Publication Data

US 2011/0303852 A1 Dec. 15, 2011

Related U.S. Application Data

(60) Provisional application No. 61/354,385, filed on Jun. 14, 2010.

(51) Int. Cl.
  *G01T 3/06* (2006.01)
(52) U.S. Cl.
  USPC ................................. 250/390.11
(58) Field of Classification Search
  CPC .......................................... G01T 3/06
  USPC ................................. 250/390.11
  See application file for complete search history.

(56) References Cited

U.S. PATENT DOCUMENTS

| | | | |
|---|---|---|---|
| 2,880,326 | A | 3/1959 | Musicant |
| 6,909,098 | B2 | 6/2005 | Bross et al. |
| 7,067,079 | B2 | 6/2006 | Bross et al. |
| 7,105,832 | B2 | 9/2006 | Dai et al. |
| 7,164,138 | B2 | 1/2007 | McGregor et al. |
| 2003/0178574 | A1 | 9/2003 | Wallace et al. |
| 2004/0104348 | A1 | 6/2004 | Bross et al. |
| 2004/0104356 | A1 | 6/2004 | Bross et al. |
| 2006/0054863 | A1 | 3/2006 | Dai et al. |
| 2009/0140158 | A1 | 6/2009 | Clothier et al. |
| 2010/0019160 | A1 | 1/2010 | Wallace |

FOREIGN PATENT DOCUMENTS

JP 04214788 A * 8/1992 ............. C09K 11/00

OTHER PUBLICATIONS

H.Y. Sohn et al. "The Effect of Particle Size Distribution on Packing Density" The Canadian Journal of Chemical Engineering, vol. 46, No. 3, pp. 162-167, Jun. 1968.*

Donald P. Hutchinson et al., "Position Sensitive Scintillation Neutron Detectors using a Crossed-Fiber Optic Readout Array," SPIE, Proceedings vol. 3769, dated Oct. 1, 1999, 4 pages.

(Continued)

*Primary Examiner* — David Porta
*Assistant Examiner* — Edwin Gunberg
(74) *Attorney, Agent, or Firm* — Abel Law Group, LLP; Robert N. Young

(57) ABSTRACT

A scintillator device includes a polymeric polymer matrix, a neutron sensing particulate material dispersed within the polymer matrix, and a scintillating particulate material dispersed within the polymer matrix. In an embodiment, the neutron sensing particulate material has an average characteristic length of not greater than about 3 microns. The scintillating particulate material has an average characteristic length of at least about 16 microns. In another embodiment, a ratio of the average characteristic length of the scintillating particulate material to the average characteristic length of the neutron sensing particulate material is at least about 55. In a further embodiment, an energy deposited in the scintillating particulate material by a positively charged particle is at least about 1.25 MeV.

24 Claims, 3 Drawing Sheets

(56) References Cited

OTHER PUBLICATIONS

The International Search Report and Written Opinion received for International Application No. PCT/US2011/040359 from the International Searching Authority (ISA/KR), dated Feb. 29, 2012, 11 pages.

T.A. Devol et al., "Evaluation of granulated BGO, GSO:Ce, YAG:Ce, CaF2:Eu and ZnS:Ag for alpha/beta pulse shape discrimination in a flow-cell radiation detector," <http://www.sciencedirect.com/science/article/pii/S0168900298013801>, Nuclear Instruments and Methods in Physics Research Section A: Accelerators, Spectrometers, Detectors and Associated Equipment, vol. 425, Issues 1-2, Apr. 1, 1999, pp. 228-231, Abstract Only, printed Apr. 1, 2010, 1 page.

Hutchinson, Donald P. et al., "Position Sensitive Scintillation Neutron Detectors using a Crossed-Fiber Optic Readout Array," Instrumentation and Controls Division, Oak Ridge National Laboratory, Oak Ridge, TN, <http://www.osti.gov/bridge/servlets/purl/9130-WfARsT/native/9130.PDF>, printed Jul. 25, 2012, 4 pages.

* cited by examiner

SCINTILLATOR INCLUDING A SCINTILLATOR PARTICULATE AND A POLYMER MATRIX

CROSS-REFERENCE TO RELATED APPLICATION

This application claims priority under 35 U.S.C. §119(e) to U.S. patent application No. 61/354,385 entitled "Scintillator Including a Scintillator Particulate and a Polymer Matrix," by Menge, filed Jun. 14, 2010, which is assigned to the current assignee hereof and incorporated herein by reference in its entirety.

FIELD OF THE DISCLOSURE

This disclosure, in general, relates to a scintillator including a scintillator particulate and a polymer matrix.

BACKGROUND

Scintillator-based detectors are used in a variety of applications, including research in nuclear physics, oil exploration, field spectroscopy, container and baggage scanning, and medical diagnostics. When a scintillator material of the scintillator-based detector is exposed to particle radiation, the scintillator material absorbs energy of incoming particles and scintillates, remitting the absorbed energy in the form of photons. For example, a neutron detector can emit photons after absorbing a neutron. A typical neutron detector includes 10 micron LiF granules and 3 micron ZnS:Ag granules encapsulated in a polymethylmethacrylate (PMMA) binder. The LiF interacts with a neutron to produce secondary particles which interact with the ZnS:Ag, causing the ZnS:Ag scintillate.

Generally, the scintillator material is enclosed in casings or sleeves that include a window to permit radiation-induced scintillation light to pass out of the package. A photon sensor, such as a photomultiplier tube, detects the emitted photons. The photon sensor converts the light photons emitted from the scintillator material into electrical pulses. The electrical pulses can be processed by associated electronics and may be registered as counts that are transmitted to analyzing equipment. Further improvements of scintillator-based detectors are desired.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillating and radiation detection arts.

Figure 1:
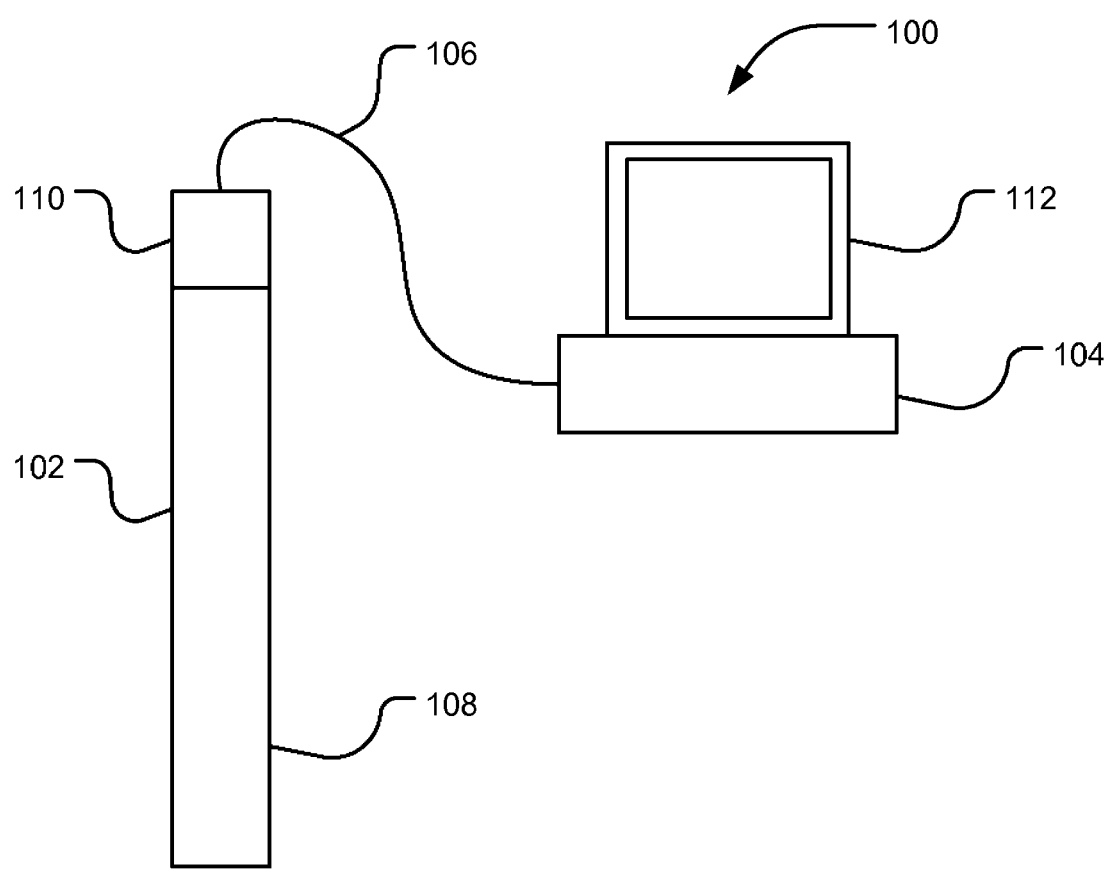
FIG. 1 is a diagram illustrating a particular embodiment of a radiation detection system.

In the embodiment of a detection system 100 illustrated in FIG. 1, a detection device 102 is coupled to a computational circuitry 104 via a communications interface 106. The detection device 102 includes a photon sensor 110 optically coupled to a scintillation material 108. When in the presence of a radiation source, the scintillation material 108 can produce scintillations that are detected by the photon sensor 110 and converted to pulse data that is transmitted via the communications interface 106 to the computational circuitry 104. The computational circuitry 104 can receive and analyze the pulse data.

For example, the computational circuitry 104 can determine a number of neutron counts or a level of neutron radiation based on the identified number of neutron events. Further, the computational circuitry 104 can provide an indication of the number of neutron events or an indication of a level of neutron radiation via an interface 112. For example, the computational circuitry can provide a visual display via interface 112 indicating a level of neutron radiation.

The scintillation material 108 can be configured to produce a light in response to receiving a target radiation, such as a neutron, gamma radiation, other target radiation, or any combination thereof, and to produce scintillation light in response to receiving the target radiation. The light produced by the scintillation material 108 can include visible light or other radiation (such as ultraviolet radiation).

Figure 2:
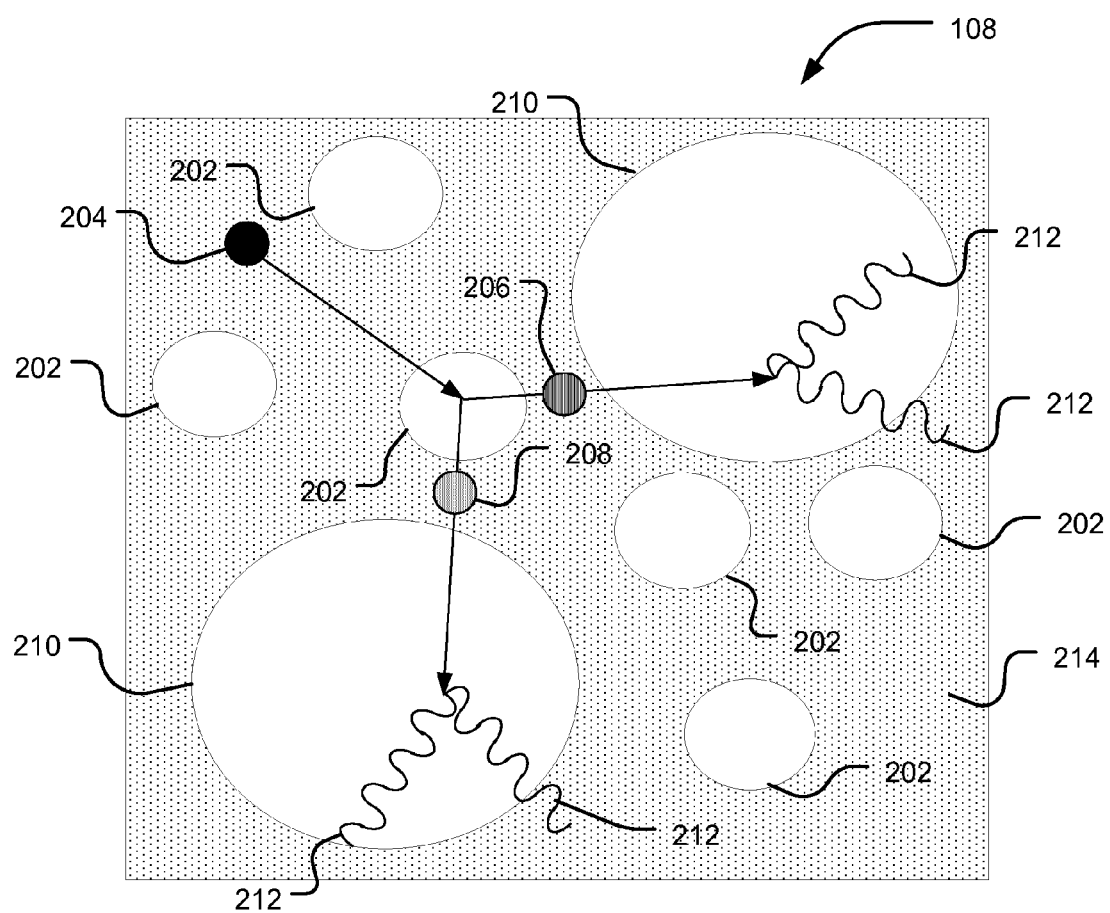
FIG. 2 is a diagram illustrating a particular embodiment of a scintillation material.

In a particular embodiment illustrated in FIG. 2, scintillation material 108 can include a plurality of components. For example, the scintillation material 108 can include a neutron sensing particulate material 202. Neutron sensing particulate material 202 can include $^3$He, $^6$Li, or $^{10}$B (in ionized or non-ionized form). In an embodiment, the $^3$He can be entrained or dissolved within a solid material. Upon receiving a neutron 204, neutron sensing particulate material 202 can produce a secondary particle, such as alpha particle 206 and triton particle 208, in response to receiving a neutron 204. In an embodiment, the secondary particle can include a positively charged particle, such as an alpha particle ($^4$He nucleus), a triton particle ($^3$H nucleus), a deuteron particle ($^2$H nucleus), a $^7$Li nucleus, or any combination thereof. The scintillation material 108 can also include a scintillating particulate material 210, such as ZnS, $CaWO_4$, $Y_2SiO_5$, ZnO, ZnCdS, $CaF_2$, yttrium aluminum garnet (YAG), yttrium aluminum perovskite (YAP), bismuth germanate (BGO), gadolinium oxyorthosilicate (GSO), or another substance to produce photons 212 in response to receiving secondary particles 206 and 208. FIG. 2 is intended to be illustrative of the interaction of particles within scintillator material 108 and should not be taken as representative of the relative size or arrangement of the neutron sensing particulate material 202 and the scintillating particulate material 210.

In an embodiment, it can be desirable for the scintillating particulate material 210 to have a low sensitivity to gamma radiation. As used herein, sensitivity refers to the absorption efficiency of the target radiation. As such, a scintillating particulate material 210 with low sensitivity to gamma photons has a low absorption efficiency for gamma radiation. As used herein, attenuation length corresponds to the distance into a material when the probability has dropped to 1/e that a particle has not been absorbed. Thus, an increased attenuation length corresponds to a decreased probability that the scintillating particulate material 210 will absorb the gamma ray. In an embodiment where the scintillating particular material 210 is not to emit significant scintillation light when the exposed to a gamma ray, the scintillating particulate material 210 can have a gamma ray attenuation length of at least about 2.34 cm at 662 keV, the energy of the principle gamma emission of Cs 137, as a scintillating material having a shorter gamma ray attenuation length is more likely to emit significant scintillation light when the exposed to a gamma ray. Thus, the scintillating material 108 can detect neutron radiation without generating a significant amount of noise due to gamma radiation. Utilizing only elements having a low atomic number, such as below 50, even below 40, can reduce the sensitivity to gamma photons. For example, the scintillating particulate material 210 can incorporate a ZnS, a ZnO, a ZnCdS, a YAG, a YAP, a $CaF_2$, or any combination thereof. Additionally, the scintillating particulate material 210 can include a dopant, such as a transition metal, a rare earth metal, or another metal. For example, the scintillation particulate material 210 can include ZnS:Ag, ZnS:Cu, $Y_2SiO_5$:Ce, ZnO:Ga, or ZnCdS:Cu.

In an embodiment, the neutron sensing particulate material 202 and a scintillating particulate material 210 can be dispersed within a polymer matrix 214. The polymer matrix 214 can include polyvinyl toluene ("PVT"), a polystyrene ("PS"), a polymethylmethacrylate ("PMMA"), or any combination thereof. The scintillation material 108 can be in the form of a cast sheet, wavelength shifting fibers, or another suitable form. When the scintillating material 108 in the form of wavelength shifting fibers, the wavelength shifting fibers can have cross sections that are substantially rectangular, substantially round, or another shape. In another particular embodiment, an additional cladding may be used, such as a fluoropolymer. In another particular embodiment, the scintillating material 108 can include a cast sheet.

In a non-limiting embodiment, the radiation detection system 100 of FIG. 1 can include a thermalyzer to convert fast neutrons into thermal neutrons, for which $^3$He, $^6$Li, and $^{10}$B have greater cross-sections. The thermalyzer can include a hydrocarbon or other thermalyzing material, such as a hydrogen-rich plastic material surrounding a portion of the detection device 102, a plastic compound, another hydrocarbon compound, another material known to be an effective thermalyzer, or any combination thereof. In a particular embodiment, the polymer matrix can be a thermalyzer when the polymer matrix includes PMMA or other hydrogen-rich polymer. In another embodiment, the thermalyzer may be located at a suitable location between a radiation source (not illustrated, outside the detection device 102) and the scintillation material 108.

The neutron sensing particulate material can include a neutron responsive compound containing a neutron responsive element, such as $^3$He, $^6$Li, or $^{10}$B, and may be part of a halide compound, a phosphate compound, a silicate compound, or any combination thereof. For example, the neutron responsive compound, such as $^6$LiF, $^6Li_3PO_4$, or $^6Li_4SiO_4$, can include the neutron responsive element $^6$Li. The scintillating particulate material can include an inorganic scintillating compound, an organic scintillating compound, or any combination thereof. An example of an inorganic scintillating compound includes a YAG, a YAP, a BGO, a GSO, a $CaF_2$, a $CaWO_4$, an $Y_2SiO_5$, a ZnS, a ZnO, a ZnCdS, or another inorganic substance to produce light in response to receiving a secondary particle. The scintillating compound can include a dopant or another added impurity. An example of an organic scintillating compound includes anthracene, a scintillating plastic, or another organic substance to produce light in response to receiving a secondary particle. In a particular embodiment, the scintillating compound can have a low sensitivity to gamma radiation, such as a ZnS, a YAG, a YAP, a $CaF_2$ a ZnO, a ZnCdS, thereby making the scintillating material substantially selective for neutron radiation. Inorganic scintillating materials having a low sensitivity to gamma radiation typically include only elements having a low atomic number, such as less than about 50, even less than about 40.

In response to absorbing a neutron, the neutron sensing particulate material can emit charged particles including positively charged particles such as an alpha particle, a triton particle, a deuteron particle, a $^7$Li nucleus, or any combination thereof. The positively charged particles can travel through the scintillation material and interact with the scintillating particulate material. Upon interacting with the positively charged particle, the scintillating particulate material can emit a photon, which can be detected by the photon sensor 110. The energy deposited in the scintillating particulate material by the positively charged particle(s) can be at least about 1.25 MeV, such as at least about 1.50 MeV, such as at least about 1.75 MeV, even at least about 2.00 MeV. The number of photons emitted by the scintillating particulate material can depend on the amount of energy deposited in the scintillating particulate material by the positively charged particle. The positively charged particles will deposit some energy in all the materials they travel through. Therefore, it can be beneficial to reduce the distance the secondary particle travels through the neutron sensing particulate material and the polymer matrix, while increasing the distance the secondary particle travels through the scintillating particulate material.

The neutron sensing particulate material can include a plurality of neutron sensing granules and can have an average characteristic length of not greater than about 3.0 microns, such as not greater than about 1.5 microns, such not greater than about 1.0 micron, even not greater than about 0.5 microns. As used herein, characteristic length is defined as twice the average distance from the center of mass of a granule to points along the surface of the granule. The average characteristic length is the average of the characteristic lengths for a plurality of granules from a representative sample of material. The average characteristic length can be measured from an electron micrograph of a sample of the material. Generally, the size of the neutron sensing granules should be relatively small to reduce energy lost by the secondary particles as they travel from the point of origin out of the neutron sensing granules.

In an embodiment, the scintillating particulate material can include a plurality of scintillating granules and can have an average characteristic length of not less than about 16 microns, such as not less than about 20 microns, such as not less than about 50 microns, such as not less than about 80 microns, such as not less than about 100 microns, even not less than about 120 microns. Generally, the size of the scintillating granules should be relatively large to allow the transfer of energy from the secondary particles to the scintillating compound to be relatively high. However, once the scintillating granules are significantly greater than the range of the secondary particles, there may not be any further increase in the amount of energy deposited into the scintillating compound. Further, packing effects of large particles can increase the average distance between the neutron sensing granules and the scintillating granules, resulting in an increase in energy being lost as the secondary particles travel through the polymer matrix. As such, in a particular embodiment, it can be desirable for the scintillating particulate material to have an average characteristic length of not greater than about 200 microns.

In another embodiment, the ratio of the average characteristic length of the scintillating particulate material to the average characteristic length of the neutron sensing particulate material can be at least about 55, such as at least about 80, such as at least about 100, even at least about 200.

In a particular embodiment, a method of making the scintillation material can include combining the neutron sensing particulate material and the scintillating particulate material to form dry particulate blend. The particulate blend can be combined with a liquid precursor for the polymer matrix. The liquid precursor and the particulate blend can be mixed to disperse the neutron sensing particulate material and the scintillating particulate material in the liquid precursor. The liquid precursor can be polymerized to form the polymer matrix. The polymerization of the liquid precursor can occur at a rate sufficient to substantially prevent the neutron sensing particulate material and the scintillating particulate material from settling out of the liquid precursor, ensuring the neutron sensing particulate material and the scintillating particulate material are substantially dispersed throughout the polymer matrix. The mixture of the liquid precursor and the particulate blend can be poured into a mold prior to polymerization to provide the polymer matrix with a desired shape of the scintillation material. Additionally, the scintillation material can be shaped, such as by cutting to a desired size.

The expected behavior of a scintillator-based detector configuration can be determined using a Monte Carlo-based computer simulation. Using the simulation, studies can be performed to determine the effect of particle size on the scintillation signal.

Figure 3:
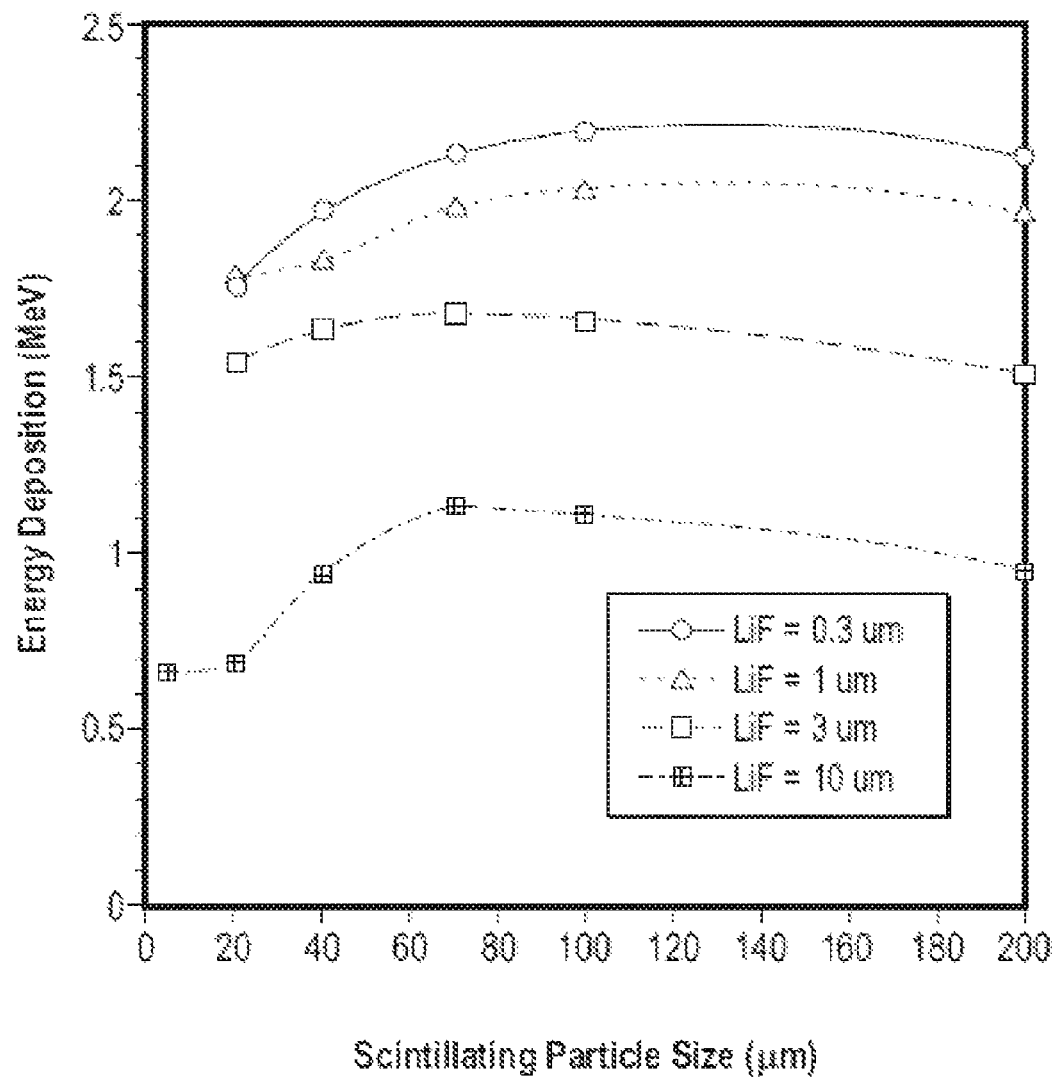
FIG. 3 is a plot illustration the effect of particle size on the scintillation signal.

Each neutron event can result from an interaction of a neutron with the neutron responsive element with a neutron sensing granule. The interaction can produce a secondary particle such as an alpha particle, a triton particle, a deuteron particle, a $^7$Li nucleus, or any combination thereof. The secondary particle can exit the neutron sensing granule and may travel through the polymer matrix and into a scintillating granule. A portion of the energy of the secondary particle can be lost while the secondary particle travels through the neutron sensing material, polymer matrix, or both. Energy from the secondary particle can be deposited into the scintillating material. FIG. 3 illustrates exemplary data showing the amount of energy deposited into the scintillating material by the secondary particle. The left most data point on the 10 micron LiF line (crossed square) corresponds to the neutron detector, as previously mentioned in the Background section of this specification, wherein the detector has 10 micron LiF granules and 3 micron ZnS:Ag granules, which is used as a comparative example.

In an embodiment, the small size of the neutron sensing particulate material relative to the size of the scintillating particulate material can lead to an increased response of the scintillator device to neutron radiation. The amount of energy transferred from the secondary particles to the scintillating granule can be increased by increasing the distance the secondary particle travels within the scintillating granule. Additionally, the small size of the neutron sensing granules can reduce the amount of energy lost from the secondary particle while traveling out of the neutron sensing granule. Further, the size difference can increase the number of neutron sensing granules in close proximity to the scintillating granules, thereby reducing the distance the secondary particle travels through the polymer matrix, further reducing the energy lost from the secondary particle.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

According to a first aspect, a scintillator device can include a polymer matrix, a neutron sensing particulate material, and a scintillating particulate material. The neutron sensing particulate material and the scintillating particulate material can be dispersed within the polymer matrix. The polymer matrix can be substantially transparent to the wavelength of light emitted by the scintillating particulate material. The neutron sensing particulate material can have an average characteristic length of not greater than about 3 microns, such as not greater than about 1.5 microns, such as not greater than about 1.0 micron, even not greater than about 0.5 microns. The scintillating particulate material can have an average characteristic length of at least about 16 microns, such as at least about 20 microns, such as at least about 50 microns, such as at least about 80 microns, such as not less than about 100 microns, even not less than about 120 microns. In embodiment, the average characteristic length of the scintillating particulate material can be not greater than about 200 microns. In an embodiment, the polymer matrix can include a polyvinyl toluene, a polystyrene, a polymethylmethacrylate, or any combination thereof.

According to a second aspect, a scintillator device includes a polymer matrix, a neutron sensing particulate material, and a scintillating particulate material. The neutron sensing particulate material and the scintillating particulate material can be dispersed within the polymer matrix. The neutron sensing particulate material can have a first average characteristic length, and the scintillating particulate material can have a second average characteristic length. The ratio of the second average characteristic length to the first average characteristic length can be at least about 55, such as at least about 80, such as at least about 100, even at least about 200. In an embodiment, the polymer matrix can include a polyvinyl toluene, a polystyrene, a polymethylmethacrylate, or any combination thereof.

According to a third aspect, a detection device can include a photon sensor and a scintillator device optically coupled to the photon sensor. The scintillator device can include a polymer matrix, and a scintillating particulate material dispersed within the polymer matrix. The scintillating particulate material can emit a photon in response to interacting with a positively charged particle. The positively charged particle can deposit an amount of energy into the scintillating particulate material. The amount of energy can be at least about 1.25 MeV, such as at least about 1.50 MeV, such as at least about 1.75 MeV, even at least about 2.00 MeV. In an embodiment, scintillator device can further include a neutron sensing particulate material dispersed within the polymer matrix. The neutron sensing particulate material can emit the positively charged particle in response to the absorption of a neutron. In an embodiment, the polymer matrix can include a polyvinyl toluene, a polystyrene, a polymethylmethacrylate, or any combination thereof.

According to a fourth aspect, a method of forming a scintillator material can include providing a neutron sensing particulate material and providing a scintillating particulate material. The neutron sensing particulate material can have an average characteristic length of not greater than about 3 microns, and the scintillating particulate material can have an average characteristic length of at least about 16 microns. The method can further include mixing the neutron sensing particulate material and the scintillating particulate material to form a particulate blend, dispersing the particulate blend within a liquid polymer precursor, and polymerizing the liquid polymer precursor to form a polymer matrix. The particulate blend can be substantially dispersed within the polymer matrix. In an embodiment, the polymer matrix can include a polyvinyl toluene, a polystyrene, a polymethylmethacrylate, or any combination thereof.

In an embodiment, the neutron sensing particulate material can emit a charged particle, such as a positively charged particle, in response to absorbing a neutron. The positively charged particle can include an alpha particle, a triton particle, a deuteron particle, a $^7$Li nucleus, or any combination thereof. In another embodiment, the neutron sensing particulate material can include a neutron responsive compound containing a neutron responsive element selected from the group consisting of $^3$He, $^6$Li, $^{10}$B, or any combination thereof. In a particular embodiment, the neutron responsive element can include $^6$Li. For example, the neutron responsive compound can include $^6$LiF.

In another embodiment, the scintillating particulate material can emit a photon in response to interacting with a positively charged particle. The scintillating particulate material can include an inorganic scintillating material. In a particular embodiment, the inorganic scintillating material can be selected from a group consisting of a YAG, a YAP, a BGO, a GSO, a CaF$_2$, a CaWO$_4$, an Y$_2$SiO$_5$, a ZnS, a ZnO, a ZnCdS, or any combination thereof. Further, the inorganic scintillating material can have a low sensitivity to gamma radiation, such as a ZnS, a ZnO, a ZnCdS, a YAG, a YAP, a CaF$_2$, or any combination thereof. In a particular embodiment, the inorganic scintillating material includes zinc.

Note that not all of the activities described above in the general description or the examples are required, that a portion of a specific activity may not be required, and that one or more further activities may be performed in addition to those described. Still further, the order in which activities are listed are not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator device comprising:
  a polymer matrix;
  a neutron sensing particulate material dispersed within the polymer matrix, the neutron sensing particulate material having an average characteristic length of not greater than about 3 microns; and
  a scintillating particulate material dispersed within the polymer matrix, the scintillating particulate material having an average characteristic length of at least about 16 microns.

2. The scintillator device of claim 1, wherein the average characteristic length of the neutron sensing particulate material is not greater than about 1.5 microns.

3. The scintillator device of claim 1, wherein the average characteristic length of the scintillating particulate material is not less than about 20 microns.

4. The scintillator device of claim 1, wherein the neutron sensing particulate material emits charged particles in response to absorbing a neutron.

5. The scintillator device of claim 1, wherein the neutron sensing particulate material includes a compound containing a neutron responsive element selected from the group consisting of $^3$He, $^6$Li, $^{10}$B, or any combination thereof.

6. The scintillator device of claim 1, wherein the scintillating particulate material emits a photon in response to interacting with a positively charged particle.

7. The scintillator device of claim 1, wherein the average characteristic length of the scintillating particulate material is not less than about 100 microns.

8. The scintillator device of claim 1, wherein the average characteristic length of the scintillating particulate material is not greater than about 200 microns.

9. A scintillator device comprising:
  a polymer matrix;
  a neutron sensing particulate material dispersed within the polymer matrix, the neutron sensing particulate material having a first average characteristic length; and
  a scintillating particulate material dispersed within the polymer matrix, the scintillating particulate material having a second average characteristic length, a ratio of the second average characteristic length to the first average characteristic length being at least about 55.

10. The scintillator device of claim 9, wherein the first average characteristic length is not greater than about 3.0 microns.

11. The scintillator device of claim 9, wherein the second average characteristic length is not less than about 16 microns.

12. The scintillator device of claim 9, wherein the neutron sensing particulate material emits charged particles in response to absorbing a neutron.

13. The scintillator device of claim 9, wherein the polymer matrix includes a polyvinyl toluene, a polystyrene, a polymethylmethacrylate, or any combination thereof.

14. The scintillator device of claim 9, wherein the second average characteristic length is not greater than about 200 microns.

15. The scintillator device of claim 9, wherein the ratio of the second average characteristic length to the first average characteristic length is at least about 55 and no greater than 400.

16. A detection device comprising:
a photon sensor; and
a scintillator device optically coupled to the photon sensor, the scintillator device comprising:
a polymer matrix; and
a scintillating particulate material dispersed within the polymer matrix, the scintillating particulate material able to emit a photon in response to interacting with a positively charged particle,
wherein an energy deposited in the scintillating particulate material by the positively charged particle is at least about 1.25 MeV.

17. The detection device of claim 16, further comprising a neutron sensing particulate material dispersed within the polymer matrix, wherein the neutron sensing particulate material emits the positively charged particle in response to the absorption of a neutron.

18. The detection device of claim 17, wherein the energy deposited in the scintillating particulate material by the positively charged particle emitted by the neutron sensing material is at least about 1.50 MeV.

19. The detection device of claim 18, wherein the energy deposited in the scintillating particulate material by the positively charged particle emitted by the neutron sensing material is at least about 1.75 MeV.

20. The detection device of claim 19, wherein the energy deposited in the scintillating particulate material by the positively charged particle emitted by the neutron sensing material is at least about 2.00 MeV.

21. The detection device of claim 17, wherein the neutron sensing material neutron sensing material has a first average characteristic length, the scintillating particulate material has a second average characteristic length, and a ratio of the second average characteristic length to the first average characteristic length is at least about 55.

22. The detection device of claim 16, wherein the scintillating particulate material includes an inorganic scintillating material.

23. The detection device of claim 22, wherein the inorganic scintillating material is selected from a group consisting of a YAG, a YAP, a BGO, a GSO, a $CaF_2$, a $CaWO_4$, a $Y_2SiO_5$, a ZnS, a ZnO, a ZnCdS, or any combination thereof.

24. The detection device of claim 23, wherein the inorganic scintillating material has a low sensitivity to gamma radiation.

* * * * *